(12) United States Patent
Khoini-Poorfard

(10) Patent No.: US 6,865,235 B2
(45) Date of Patent: Mar. 8, 2005

(54) MULTI-PROTOCOL MODULATOR

(75) Inventor: Ramin Khoini-Poorfard, Coopersburg, PA (US)

(73) Assignee: Agere Systems Inc., Allentown, PA (US)

( * ) Notice: Subject to any disclaimer, the term of this patent is extended or adjusted under 35 U.S.C. 154(b) by 705 days.

(21) Appl. No.: 09/800,192

(22) Filed: Mar. 6, 2001

(65) Prior Publication Data

US 2002/0168026 A1 Nov. 14, 2002

(51) Int. Cl.⁷ .............................................. H04L 27/10
(52) U.S. Cl. ...................... 375/272; 375/280; 375/305; 375/308; 455/102; 370/204; 332/108; 332/120; 332/151
(58) Field of Search ................................ 975/261, 264, 975/269, 272–274, 279, 280, 298, 305, 308; 522/108, 119, 120, 151; 455/102; 370/206, 207, 204

(56) References Cited

U.S. PATENT DOCUMENTS

| | | | |
|---|---|---|---|
| 6,377,817 B1 * | 4/2002 | Hakaste et al. ............ | 455/553.1 |
| 6,400,928 B1 * | 6/2002 | Khullar et al. ............ | 455/67.11 |
| 6,473,506 B1 * | 10/2002 | Hook et al. .................. | 379/279 |
| 6,687,507 B2 * | 2/2004 | Fischer et al. ............ | 455/456.6 |
| 6,690,751 B1 * | 2/2004 | Nikula et al. ................ | 375/341 |

OTHER PUBLICATIONS

H. Shankar, "Emerging Technology Series #1: EDGE in WIreless Data," Communication Systems Design, vol. 6, No. 1, 16 pages, Jan. 2000.
P.A. Laurent, "Exact and Approximate Construction of Digital Phase Modulations by Superposition of Amplitude Modulated Pulses (AMP)," IEEE Transactions on Communications, vol. COM–34, No. 2, pp. 150–160, Feb. 1986.

* cited by examiner

Primary Examiner—Dac V. Ha

(57) ABSTRACT

A multi-protocol modulator capable of supporting two or more different modes of operation, each mode of operation corresponding to a different type of modulation, comprises an m-level phase shift keying (m-PSK) modulator which receives a serial input data stream and maps data contained therein into a constellation including m equidistant phases in accordance with a predetermined mapping scheme. The m-PSK modulator is shared by at least two different modulation protocols by allowing the mapping scheme to be selectively changed depending upon the modulation protocol used. The multi-protocol modulator further includes a phase rotator operatively coupled to the output of the m-PSK modulator. The phase rotator selectively rotates the phase of the m-PSK signal by a predetermined phase rotation value. The phase rotator is shared by the two or more modulation protocols by allowing the phase rotation value to be selectively modified depending upon the modulation protocol used. A phase rotated signal is then passed through a pulse shaping filter having a linearized Gaussian response.

21 Claims, 9 Drawing Sheets

MULTI-PROTOCOL MODULATOR

FIELD OF THE INVENTION

The present invention relates generally to signal modulation, and more specifically relates to techniques for modulating signals using a modulator capable of operation in one of multiple modulation protocols.

BACKGROUND OF THE INVENTION

There are presently many cellular radio or mobile telephone systems conventionally employed to provide high quality mobile communications over wide coverage areas. One such system, for example, is the digital mobile telephone system GSM (Groupe Special Mobile). Presently, developments relating to the GSM standard are controlled by the European Telecommunications Standards Institute (ETSI) under the Special Mobile Group (SMG) technical committee. The document entitled "GSM Technical Specifications," released by the SMG and available from the Publications Office of the ETSI, sets forth the technical requirements of the GSM standard and is incorporated herein by reference. GSM technology is used in a very broad variety of applications, including, for example, handheld and portable devices, PCMCIA (Personal Computer Memory Card International Association) cards, personal computers, PDAs (personal digital assistant), adapter cards, modems, etc.

The demand for higher data transmission rates in the GSM system has pushed standards groups to consider new techniques for increasing the information rate. For high-bandwidth wireless communications, the ETSI has recently adopted a new modulation protocol called EDGE (Enhanced Data Rates for GSM Evolution). To achieve enhanced data rates, the EDGE protocol utilizes an eight-level phase shift keying (8PSK) modulation and multi-slot transmission technique. Moreover, EDGE-enabled wireless products are required to support 850-MHz Advanced Mobile Phone System (AMPS), IS-136 (a North American Digital Cellular digital speech transmission standard) in the 850-MHz and 1900-MHz bands, along with GSM and EDGE in some combination of the 900-MHz, 1800-MHz and 1900-MHZ bands in order to meet telecommunication carriers' requirements for a mobile telephone that can roam globally. The baseband section of a wireless EDGE-enabled device should therefore support a variety of modulation methodologies, such as FM, differential quadrature phase shift keying (DQPSK) and GMSK modems, along with IS-136, GSM, half-rate voice encoders (vocoders), etc. As a further challenge to designers, it would be desirable to implement all of these features in a cost-effective manner and in an architecture which occupies the smallest physical footprint to meet ever shrinking packaging requirements. Conventional techniques do not adequately address these issues.

The EDGE modulation protocol achieves greater modulation efficiency than the GMSK modulation protocol used in the GSM standard, although such modulation efficiency is achieved at the expense of a reduced system noise margin. As stated above, the EDGE technology defines a new high data rate physical layer, namely, an 8PSK modulation architecture, instead of a GMSK modulation protocol. With an 8PSK modulation architecture, the gross data rate increases by a factor of three over that of GSM, since each EDGE pulse or symbol carries three bits of information versus a one-bit-per-symbol rate for GSM. The EDGE modulation protocol is described in further detail, for example, in an article by Hari Shankar entitled "Emerging Technology Series #1: EDGE in Wireless Data," *Communication Systems Design*, Vol. 6, No. 1, January 2000, which is incorporated herein by reference. However, although an EDGE modulation protocol may be more efficient compared to a GMSK modulation protocol, GSM systems are still widely employed. Accordingly, it would be desirable to include both a GMSK modulator (e.g., for voice communications) and an EDGE modulator (e.g., for high data rate communications) in a wireless EDGE-enabled product. Unfortunately, using conventional approaches, the increased physical size and power requirements of the product become an issue as a result of the inclusion of the two independent modulators and their corresponding timing and control circuitry.

SUMMARY OF THE INVENTION

The present invention provides techniques for combining two or more modulation architectures by sharing at least one functional sub-system between the two architectures. In accordance with one aspect of the invention, a multi-protocol modulator capable of supporting two or more different modes of operation, each mode of operation corresponding to a different type of modulation, comprises an m-level phase shift keying (m-PSK) modulator which receives a serial input data stream and maps data contained therein into a constellation including m equidistant phases according to a predetermined mapping scheme. The m-PSK modulator is shared by at least two different modulation protocols by allowing the mapping scheme to be selectively changed depending upon the modulation protocol used. The multi-protocol modulator further includes a phase rotator operatively coupled to the output of the m-PSK modulator. The phase rotator selectively rotates the phase of the m-PSK signal by a predetermined phase rotation value. The phase rotator is shared by the two or more modulation protocols by allowing the phase rotation value to be selectively modified depending upon the modulation protocol used. A phase rotated signal is then passed through a pulse shaping filter having a linearized Gaussian response.

In a preferred embodiment, the invention uniquely recognizes that a GMSK modulation architecture can be modified, using a Laurent series approximation, to operate in a manner consistent with an EDGE modulation architecture. Accordingly, with only slight modifications to the EDGE modulator architecture, the EDGE modulation system can support a GMSK modulation protocol. The present invention also preferably includes means for selectively controlling which modulation protocol is to be employed at any given time. An important advantage of this novel approach is that the combined GMSK/EDGE modulator eliminates redundant functional sub-systems, thus significantly reducing the physical size and power requirements of the modulation system.

In one implementation of the above-noted preferred embodiment, a combined GMSK/EDGE modulator comprises an eight-level phase shift keying (8PSK) modulator which receives a serial input data stream and maps the data into a constellation including eight equidistant phases in accordance with a predetermined mapping scheme. The 8PSK modulator is shared by the GMSK and EDGE protocols by allowing the mapping scheme to be selectively changed depending upon whether a GMSK or an EDGE modulation protocol is desired. The combined GMSK/EDGE modulator further includes a phase rotator operatively coupled to the output of the 8PSK modulator. The phase rotator selectively rotates the phase of the 8PSK signal by a predetermined value. Again, the phase rotator is shared by the two modulation protocols by allowing the phase rotation value to be selectively modified depending upon whether GMSK or EDGE modulation is used. The phase rotated signal is then passed through a pulse shaping filter having a linearized Gaussian response.

DETAILED DESCRIPTION OF THE INVENTION

The present invention will be illustrated below in conjunction with an exemplary EDGE/GMSK modulator system. Although particularly well-suited for use in mobile communication systems over a wireless communication channel, the invention is not limited to use with any particular type of communication system or channel. The term "communication channel" as used herein is intended to include a wireless communication link, such as, for example, cellular, radio frequency (RF), microwave, satellite, etc., and may also include a dedicated communication line, such as, for example, telephone, cable, fiber optic, etc. Furthermore, it is to be understood that various other implementations of the multi-protocol modulator, and the functional sub-systems comprising the multi-protocol modulator, are similarly contemplated by the present invention, including the combination of data and voice modulation.

Mobile communication systems typically employ a modulation technique which often requires a differentially coherent demodulation architecture. This is due, at least in part, to rapid and unpredictable phase changes that a transmitted signal may go through due to occurrences such as, for example, reflections off objects, which make carrier phase recovery difficult if not impossible. GSM, for instance, uses a differentially encoded GMSK technique and the North American TDMA (IS-136) scheme uses $\pi/4$ differential quadrature phase shift keying (QPSK).

A primary aspect of the present invention, as described herein below, is the combining of two or more different modulation architectures (e.g., a GMSK modulator and an EDGE modulator) in such a manner that one or more similar functional sub-systems or components (and their associated circuitry) comprising the two or more modulation architectures are shared. For example, the present invention uniquely recognizes that the GMSK modulation architecture can be modified, using a Laurent series approximation, to operate in a manner consistent with an EDGE modulation architecture. Therefore, with only slight modifications to the EDGE modulation architecture, the EDGE modulation system can be used to support a GMSK modulation architecture. The present invention also preferably includes means for selectively controlling which modulation protocol is to be employed at any given time. In order to more clearly describe the novel techniques of the present invention, a brief overview of the GMSK and EDGE modulation systems will first be presented.

Figure 1A:
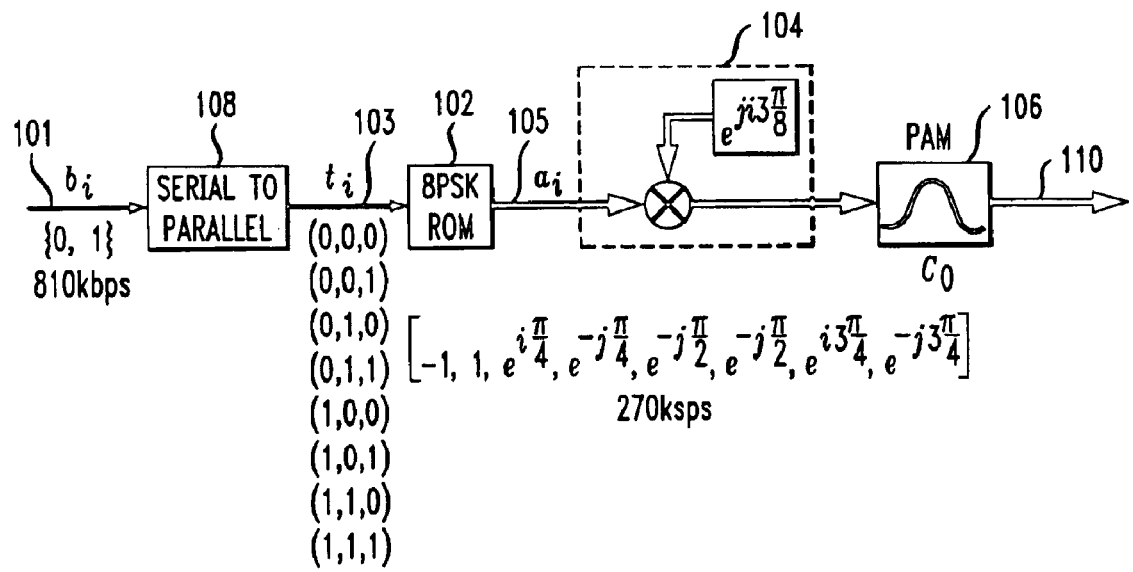
FIG. 1A is a system block diagram illustrating an eight-level phase shift keying (8PSK) modulator.

Referring now to FIG. 1A, by way of example only, an EDGE modulator 100 is illustrated.

Figure 1B:
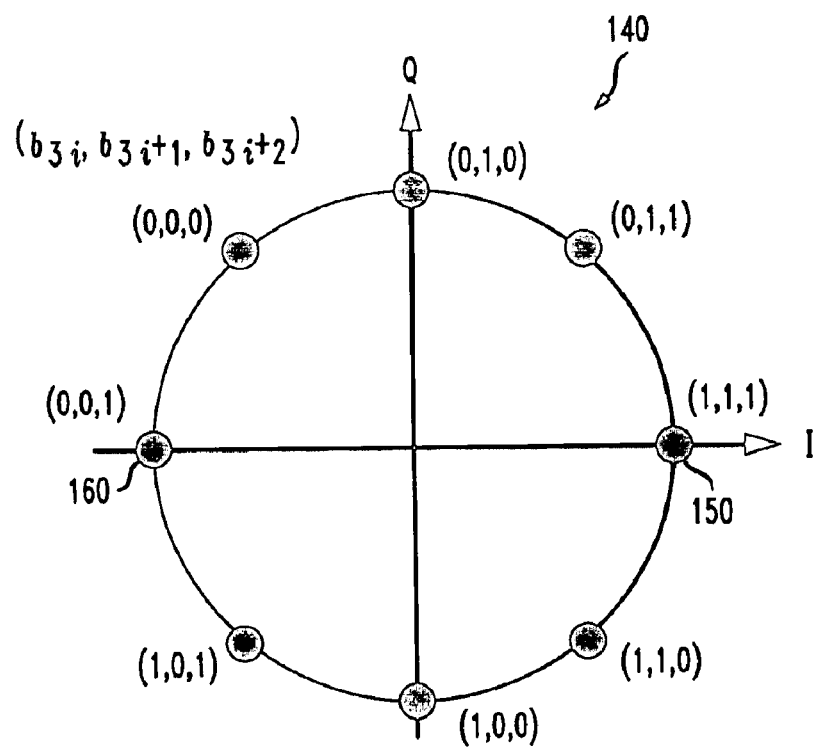
FIG. 1B is a graphical representation of an illustrative symbol mapping for the 8PSK modulator of FIG. 1.

It is to be appreciated that the thin arrows (e.g., 101, 103) depicted in FIG. 1A and throughout the several figures, are intended to represent a real signal component while the thicker arrows (e.g., 105, 110) are intended to represent a complex signal component (e.g., I+jQ). The EDGE modulator 100 includes an 8PSK modulator, preferably implemented as an 8PSK ROM 102. Before being presented to the 8PSK ROM 102, an input serial bit stream ($b_i$) 101 is first converted into three-bit ran words or triplets ($t_i$) 103. Preferably, the conversion of the serial bit stream 101 into triplets 103 is accomplished by a serial-to-parallel converter 108, or a suitable equivalent thereof, which is operatively coupled to the input of the 8PSK modulator 102. The serial-to-parallel converter 108 may be implemented, for example, by a shift register or buffer. Each triplet of ($b_i$, $b_{i+1}$, $b_{i+2}$) is mapped into a point of a constellation 140 comprising eight preferably equidistant phases, an example of which is shown in FIG. 1B. The mapping is preferably performed using Gray encoding, whereby only one bit position changes between any two adjacent symbols. An advantage of using Gray encoding is that it minimizes the number of interpreted error bits when a symbol is incorrectly decoded as one of its adjacent neighbors. Furthermore, the modulation protocol can be reduced to a robust (though inefficient) binary phase shift keying (BPSK) protocol if required (e.g., when the communication channel is noisy). For example, a mid-amble portion of a burst (e.g., a sequence of bits in a frame of a transmission used as a timing reference for synchronization) may be transmitted by using only phase zero (0) and phase 180 degrees. This can be accomplished by mapping each mid-amble bit which is zero (0) to constellation point (1, 1, 1) 150 and mapping each mid-amble bit which is one (1) to constellation point (0, 0, 1) 160, although other mapping methodologies are similarly contemplated, as understood by those skilled in the art.

With continued reference to FIG. 1A, since the envelope of an 8PSK signal can instantaneously become zero, which significantly complicates the design of the power amplifier circuitry used to transmit the EDGE signal, the 8PSK signal is preferably continuously rotated by 3π/8 radians, which, in essence, translates to a frequency shifting of about 50.8 kHz. This rotation is accomplished by a phase rotator 104 operatively coupled to the output of the 8PSK modulator 102 and configured to perform the appropriate signal phase rotation. By continuously rotating the 8PSK signal constellation in this manner, the envelope of the signal never becomes zero. The frequency-shifted 8PSK signal is then preferably passed through a pulse shaping filter 106, such as a pulse amplitude modulation (PAM) filter having a linearized Gaussian response. The filter 106 will substantially band limit the signal in such a manner that it preferably fits within a GMSK spectral mask. Hence, the resulting signal 110 can coexist with a GMSK signal in a GSM communication a network. If a quadrature modulation architecture is used, it is to be appreciated that the pulse shaping filter 106 may actually be implemented as two separate filters having substantially identical response characteristics, one filter for each quadrature component of the signal (e.g., I and Q). Additionally, it is contemplated that two or more pulse shaping filters may be cascaded (e.g., in series connection), with each filter being operatively configured so that the overall filtering characteristic is substantially a linearized Gaussian response, as understood by those skilled in the art.

Figure 2A:
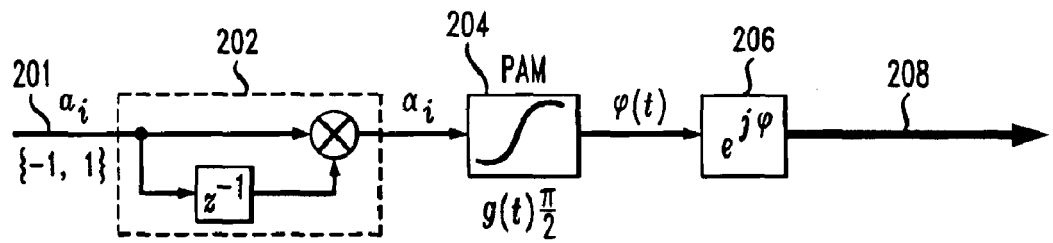
FIG. 2A is a system block diagram illustrating a Gaussian mean shift keying (GMSK) modulator.

With reference now to FIG. 2A, a GMSK modulator 200 is illustrated. As known by those skilled in the art, GMSK is a modulation technique in which only the phase of the carrier signal is modulated, thus the GMSK signal exhibits a constant envelope waveform. Although there are various ways to implement a GMSK modulation protocol, a traditional means of generating a GMSK signal, as shown in FIG. 2A, generally includes a differential encoder 202 for encoding an input serial bit stream 201 and filtering the integrated signal using a Gaussian spectral shaping filter 204 prior to modulation. The filtered signal is then passed to a phase modulation stage 206 where the carrier is modulated by the baseband information sequence to obtain an output GMSK signal 208.

In accordance with the present invention, a combined GMSK/EDGE modulator is formed wherein one or more similar functional sub-systems or components of the EDGE and GMSK modulators are preferably shared, among other important benefits, to reduce the physical size and power consumption of the device. As previously stated herein, in order to accomplish this GMSK/EDGE combination, the present invention preferably utilizes an EDGE modulation architecture and adapts a GMSK modulation architecture to conform to the EDGE modulation system, preferably using an approximation of the GMSK waveform based, at least in part, upon a truncated Laurent series decomposition of the GMSK signal.

In an article by P. A. Laurent entitled "Exact and Approximate Construction of Digital Phase Modulation by Superpositions of Amplitude Modulated Pulses," *IEEE Trans. on Comms.*, Vol. COM-34, No. 2, pp. 150–160, February 1986, which is incorporated herein by reference, it is disclosed that any constant-amplitude digital phase modulation may be represented as a sum of a finite number of time-limited amplitude modulated (AM) pulses. This implies that a phase modulator can be approximated using a set of amplitude modulators, wherein the phase-shaping filter of the phase modulator is replaced by an equivalent set of filters, $C_1(t)$, for the amplitude modulators. Thus, it follows that any partial response continuous phase-modulated (CPM) signals, including Gaussian filtered minimum shift keying (GMSK) signals, can be described as a linear superposition of pulses, $C_0(t) \ldots C_{M-1}(t)$, with $M=2^{L-1}$ if $g(t)=0$ for $t<0$ and $g(t)=1$ for $t>LT$, where $g(t)$ is a step response function and T is the symbol duration (e.g., 270k samples per second for GMSK and EDGE modulation). Although the last assumption is not exactly true in the case of GMSK, it is still a valid approximation because the function $g(t)$ rapidly approaches the desired values outside an interval of length LT with L=4. For a large number of phase-modulated systems, including GMSK, the linear term, $C_0(t)$, contains a significant portion of the signal energy. In fact, if the Laurent series is truncated to its linear term, $C_0(t)$, the sum of the amplitudes of the nonlinear terms is less than ten percent (10%) of the amplitude of the linear term. The combined power of all nonlinear terms is about 24 dB or more below the linear term. Hence, a linear truncation of the Laurent decomposition is a very good approximation of a GMSK waveform.

Figure 2B:
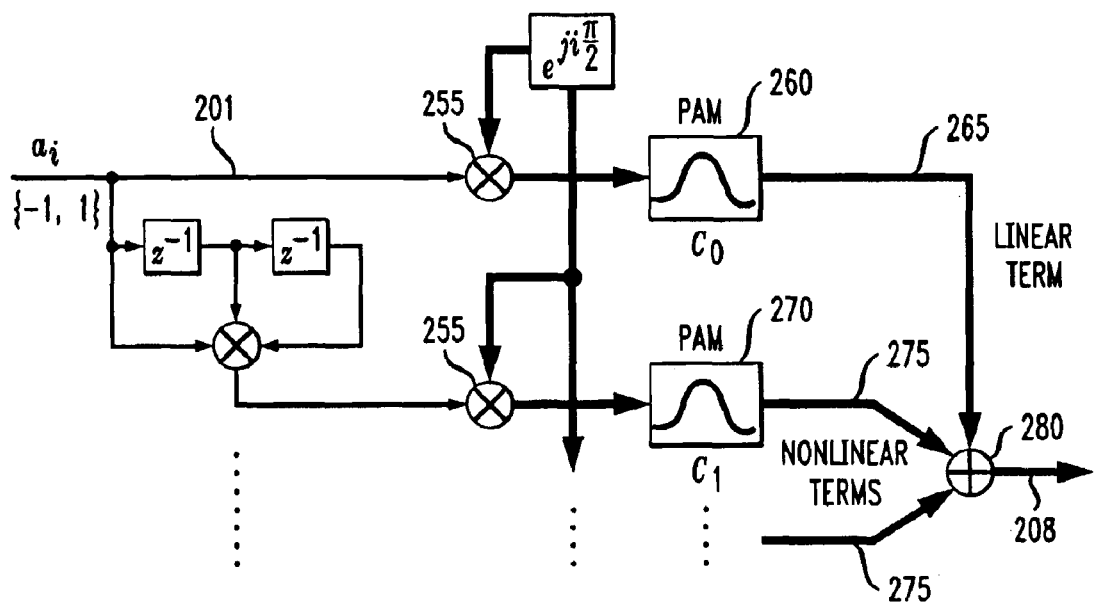
FIG. 2B is a block diagram illustrating a GMSK modulator based on a Laurent series decomposition.

FIG. 2B illustrates a GMSK modulator implementation 250 based upon a Laurent approximation. As shown in FIG. 2B, the output GMSK signal 208 is preferably represented by a superposition 280 of amplitude modulators 255, where the phase shaping filter of the phase modulator (204 in FIG. 2A) is replaced by an equivalent set of filters, preferably implemented as pulse amplitude modulation (PAM) filters 260, 270, for the amplitude modulators. As noted above, the Laurent decomposition may be classified into a linear term 265, corresponding to a pulse shaping filter 260 having a coefficient $C_0$, and a plurality of nonlinear terms 275, corresponding to pulse shaping filters 270 having coefficients $C_1$ through $C_{M-1}$.

In order to justify that a linear truncation of the Laurent decomposition (e.g., using only the $C_0$ component) is a good approximation of a GMSK waveform, it can be shown that such a modulator satisfies the ETSI requirement for acceptable GMSK modulation. There are essentially two figures of merit defined in the ETSI standard which can be used to demonstrate this, namely, the spectral mask (which is a frequency-domain characteristic) and the phase error (which is a time-domain characteristic). By first looking at the spectral mask, it can be observed that the spectrum of $C_0$ is always lower than that of a GMSK signal. Hence, a linear truncation of the Laurent decomposition will not violate the spectral mask requirements.

Figure 2C:
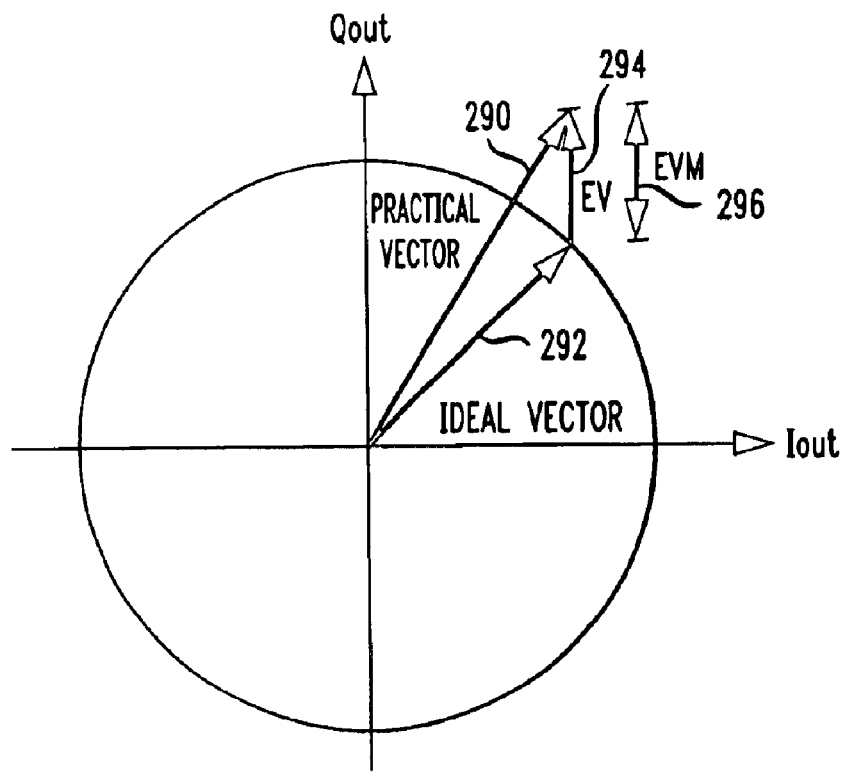
FIG. 2C is a graphical representation of an illustrative error vector magnitude (EVM) definition.

With regard to phase error, an error vector magnitude (EVM) can be defined, as illustrated in FIG. 2C. With reference to FIG. 2C, by drawing the quadrature outputs of the pulse shaping filters (e.g., Iout and Qout) in a complex plane as a practical vector 290 and subtracting this vector from an ideal vector 292 (e.g., with no nonlinearities), one can calculate an error vector (EV) 294. The magnitude of the EV 294, after it is normalized to the RMS value of the ideal vector, is referred to as an EVM 296 and is generally measured in percentages. It is to be appreciated that before subtraction takes place, the practical vector 290 should be preprocessed such that it will include no offset, no frequency and/or phase shift and no attenuation. In terms of degrees, the maximum phase error can calculated as $$\varphi_{error,max} = 0.1 \text{rad} = 0.1 \times \frac{180°}{\pi} = 5.7° < 20°$$

where 20° is the ETSI specification for maximum allowable phase error. Similarly, it can be shown that the RMS phase error ($\varphi_{error,max}$) is equal to about 2.6 degrees, which is well below the five degrees (5°) set forth in the ETSI specification for maximum RMS phase error. Hence, the above truncated Laurent approximation is valid for GMSK under the ETSI specification.

Figure 3:
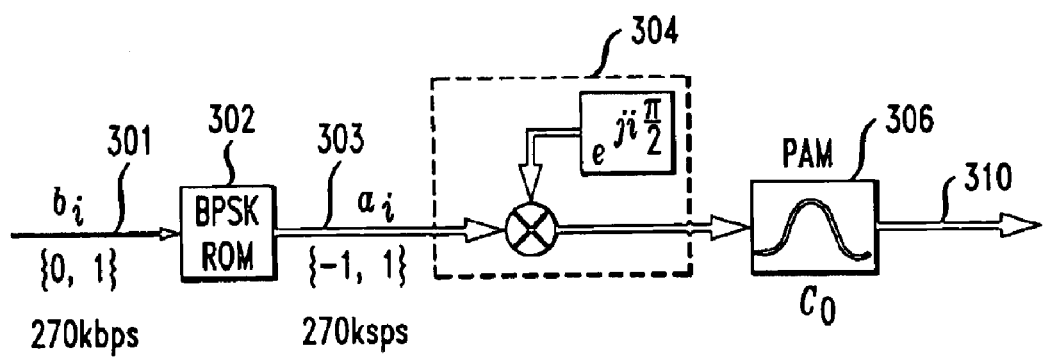
FIG. 3 is a system block diagram illustrating a GMSK modulator based on a truncated Laurent series approximation.

A GMSK modulator based on the truncated Laurent approximation is illustrated in FIG. 3. The Laurent-approximated GMSK modulator 300 includes a binary phase shift keying (BPSK) modulator, preferably implemented as a BPSK ROM 302, which receives an input serial data stream 301. A phase rotator 304 is operatively coupled to an output 303 of the BPSK ROM 302 and functions to rotate the phase of the BPSK signal 303 by a predetermined phase value, namely, $\pi/2$ radian (90 degrees). The phase rotated signal is then passed through a pulse shaping filter 306, which is preferably implemented as a PAM filter having a linearized Gaussian response, to generate an output GMSK signal 310. With reference to FIGS. 1A and 3, it is to be appreciated that the Laurent-approximated GMSK modulator 300 appears substantially similar, at least in architecture, to the EDGE modulator 100. Specifically, both modulation architectures include a phase rotator 104, 304 (although the amount of phase rotation differs for the two modulation protocols) and both modulation architectures use the $C_0$ coefficient as their pulse shaping filter 106, 306. Furthermore, as previously stated herein, the 8PSK modulator 102 maybe utilized for BPSK modulation (as may be required for GMSK). To do so, the GMSK input data stream 301 is preferably converted such that every "1" in the GMSK bit sequence, corresponding to a phase of $\pi$ radian, is substituted with a triplet, ($b_i$, $b_{i+1}$, $b_{i+2}$), of (0,0,1), and likewise every "0" in the GMSK bit sequence, corresponding to a phase of zero radian, is substituted with a triplet of (1,1,1). It is to be appreciated that this conversion may be performed in hardware or software before the bit stream is programmed into a transmit buffer (not shown), or a suitable equivalent thereof, if employed.

Figure 4:
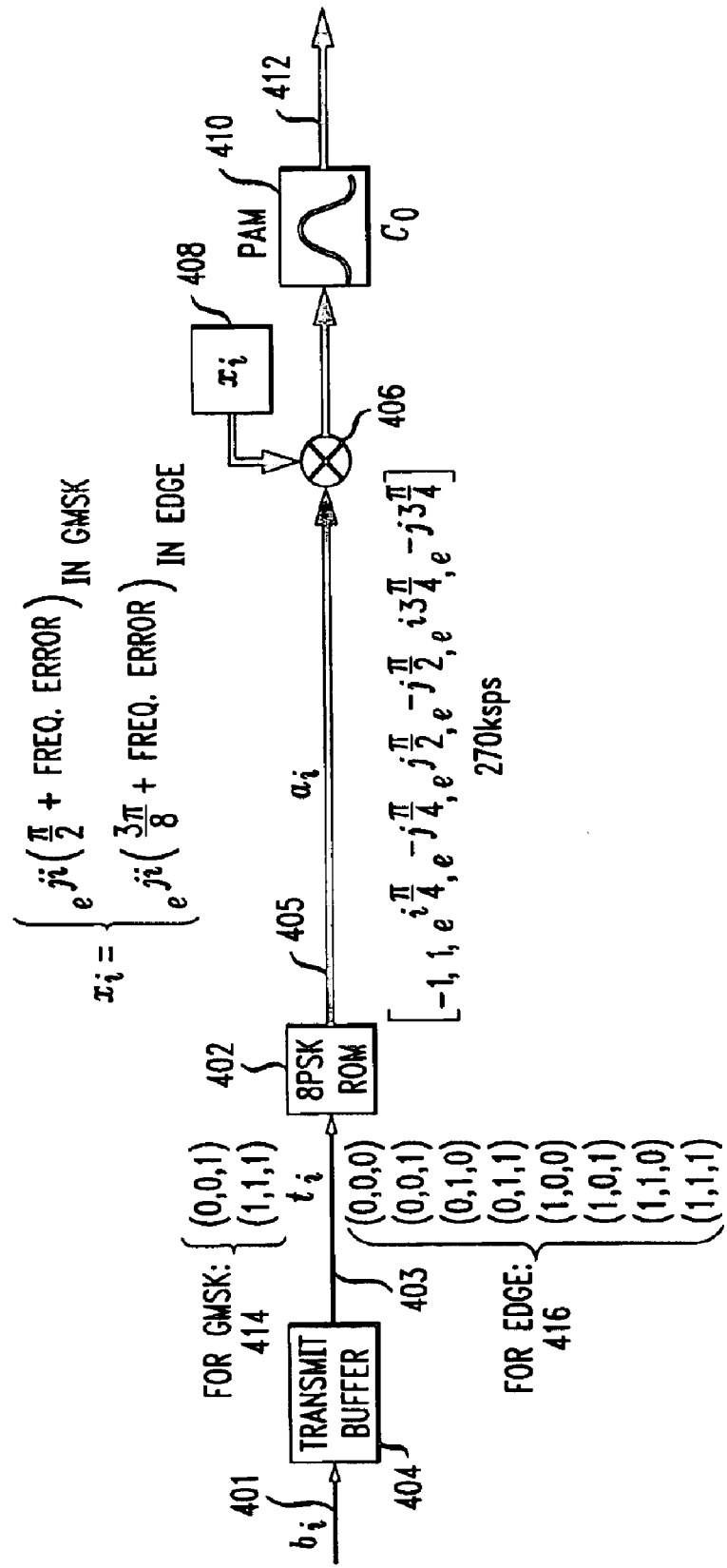
FIG. 4 is a system block diagram illustrating a combined GMSK/EDGE modulator formed in accordance with the present invention.

With reference now to FIG. 4, an illustrative combined GMSK/EDGE modulator 400, formed in accordance with the present invention, is shown. The GMSK/EDGE modulator 400 includes an 8PSK modulator which is implemented as an 8PSK ROM 402, as depicted. The 8PSK ROM 402 preferably includes three address inputs (not shown) for accessing one out of eight predetermined output phase values stored therein. In order to accommodate an EDGE protocol signal, the 8PSK modulator 402 should be capable of receiving an input data stream 403 comprised of triplets ($b_i$, $b_{i+1}$, $b_{i+2}$), each bit corresponding to an address input. The present invention similarly contemplates that the 8PSK modulator may be implemented, for example, as a gate array or a combination of logic gates based on a predetermined truth table definition.

In order to allow the GMSK/EDGE modulator 400 to interface with a digital signal processor (DSP) or other processing device (e.g., CPU), a transmit buffer 404 or similar temporary storage device is preferably operatively connected between the input bit stream 401 and the 8PSK modulator 402. The transmit buffer 404 enables a DSP or a suitable equivalent thereof, which supplies the GMSK/EDGE modulator with data, to perform other system tasks while the modulator 400 is processing a particular data burst. Generally, the processor operates at a significantly higher rate than the GMSK/EDGE modulator, and therefore without the transmit buffer 404, the processor would be required to wait for the GMSK/EDGE modulator, thus undesirably impacting system performance and efficiency.

The transmit buffer 404 preferably includes conversion circuitry, such as, for example, a serial-to-parallel converter or shift register, to transform the input serial bit stream 401 into triplets 403, as required by the 8PSK modulator 402. As shown in FIG. 4, the transmit buffer 404 is preferably responsive to a GMSK/EDGE modulation select signal for selectively switching between a GMSK input bit mapping 414 and an EDGE input bit mapping 416, previously described herein. The select signal may be generated, for example, by modulation select circuitry internal to the transmit buffer 404 or it may be generated externally. In either case, the modulation select circuitry (if employed) may be used globally, for example, to control other functional sub-systems of the GMSK/EDGE modulator 400. The present invention further contemplates that the modulation select circuitry may include means for automatically selecting the modulation type (e.g., GMSK or EDGE) in response to information contained in the input data stream. A modulation select switch (e.g., operated manually by a user) may also be employed to change modulation protocols.

With continued reference to FIG. 4, the output of the 8PSK modulator 402 is preferably coupled to a rotator 406 for operatively rotating the phase of an 8PSK signal 405 by a predetermined phase rotation value. The phase rotation value is preferably programmed into a register 408, or similar device, operatively connected to the rotator 406 so that virtually any phase rotation scheme is possible. In fact, the present invention contemplates using this feature to perform crystal frequency correction as well by simply adding the phase error ramp term to the GMSK or EDGE phase rotation values, namely, $\pi/2$ for GMSK modulation or $3\pi/8$ for EDGE modulation.

In one embodiment of the present invention, the rotator 406 is implemented as a multiplier which adds a phase ramp to the output of the 8PSK modulator 402. Preferably, the phase ramp gradually increases in time and has a slope that is selectively programmable. The ramp signal may be generated, for example, by a two-input adder, with one input being coupled to the output of the 8PSK modulator 402 and the other input being coupled to a programmable counter. The counter preferably counts upward and is allowed to wrap around after 360 degrees if an overflow or underflow condition occurs, i.e., modulo $2\pi$ arithmetic is used. Moreover, the step size of the counter is preferably programmable and maybe operatively configured for either GMSK modulation (e.g., $\pi/2$ rad/step) or EDGE modulation (e.g., $3\pi/8$ rad/step).

The output of the rotator 406 is coupled to a pulse shaping filter 410. The pulse shaping filter 410 is preferably a pulse amplitude modulator that is truncated to a linear Laurent coefficient $C_0$, as previously described herein. Depending on whether the modulator 400 is selected for a GMSK mode or an EDGE mode of operation, the output 412 of the pulse shaping filter 410 will be a GMSK or EDGE modulated signal, respectively, of the input data stream 401. In a preferred embodiment of the invention, the pulse shaping filter 410 is implemented as a finite impulse response (FIR) filter. As known by those skilled in the art, a FIR filter is essentially a delay line having a predetermined number of taps (e.g., coefficient/delay pairs). The FIR filter multiplies an input sample in the delay line by a corresponding coefficient, accumulates the result and shifts the delay line by one sample to make room for the next input sample. It is to be appreciated that FIR filters are well-suited for implementation by a DSP or other processor, such as, for example, by looping a single instruction.

EXAMPLE

Combined GMSK/EDGE Transmit Channel

Figure 5A:
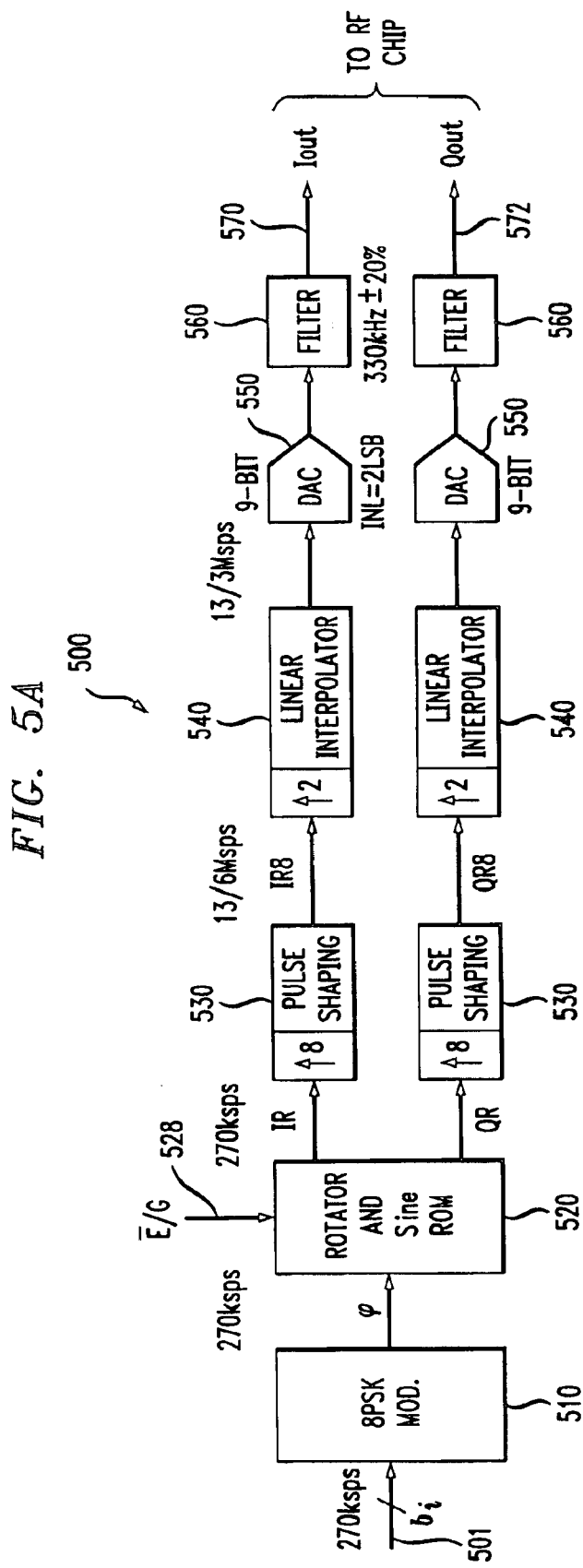
FIG. 5A is a system block diagram illustrating an exemplary embodiment of a transmit channel for a combined GMSK/EDGE modulator system, formed in accordance with the present invention.

By way of example only, FIGS. 5A–5D illustrate an exemplary embodiment of a transmit channel for a combined GMSK/EDGE system 500 formed in accordance with the present invention. With reference to FIG. 5A, the transmit channel is preferably quadrature and includes an 8PSK modulator 510, a rotator and sine ROM 520, a pair of pulse shaping filters 530, a pair of linear interpolators 540, a pair of digital-to-analog converters (DACs) 550 and a pair of smoothing filters 560. Quadrature output signals 570 and 572 are preferably coupled to an RF stage, which is typically off-chip. As shown in FIG. 5A, rotator and sine ROM 520 preferably includes a control input, namely, E~/G, for operatively selecting between an EDGE modulation protocol and a GMSK modulation protocol.

Figure 5B:
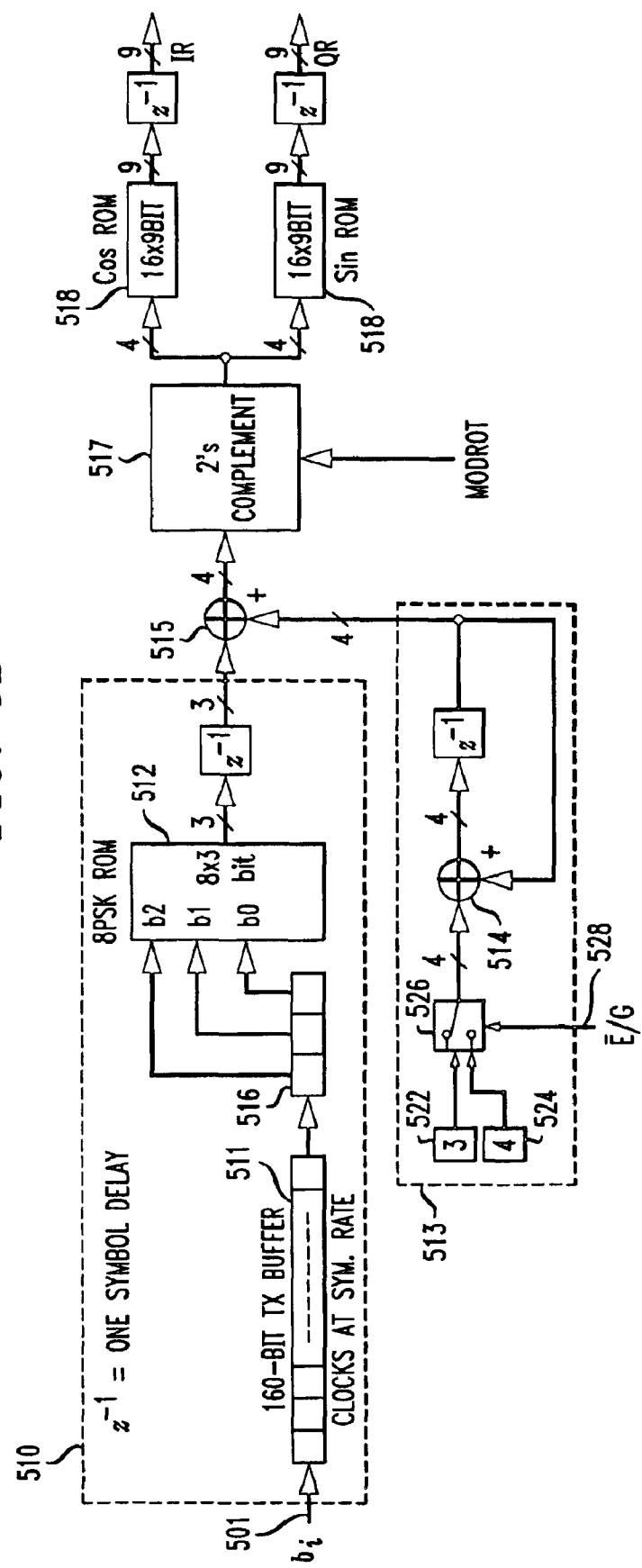
FIG. 5B is a block diagram illustrating an exemplary embodiment of the 8PSK modulator, phase rotator and sine ROM sub-systems of the transmit channel depicted in FIG. 5A, formed in accordance with the present invention.

With specific reference to FIG. 5B, the 8PSK modulator 510 preferably includes an 8PSK ROM 512 which essentially looks at three consecutive bits in the input data stream 501 (which form one symbol) and generates a three-bit phase at its output (e.g., for EDGE modulation, 0=0 radian, 1=2π/8 rad, . . . 7=2π−2π/8). The input data stream is buffered by a transmit buffer 511 before being fed to a three-bit serial-to-parallel converter 516. The contents of the 8PSK ROM 512 will remain the same regardless of whether a GMSK or an EDGE modulation protocol is selected, thereby requiring only a single 8PSK ROM. Table 1 below illustrates preferred contents of the 8PSK ROM.

TABLE 1

| ROM Address (b2, b1, b0) | ROM value (decimal) | ROM value (binary) |
|---|---|---|
| (0, 0, 0) | 3 | 011 |
| (1, 0, 0) | 4 | 100 |
| (0, 1, 0) | 2 | 010 |
| (1, 1, 0) | 1 | 001 |
| (0, 0, 1) | 6 | 110 |
| (1, 0, 1) | 5 | 101 |
| (0, 1, 1) | 7 | 111 |
| (1, 1, 1) | 0 | 000 |

As stated above, for GMSK modulation, a mapping including only two phase values is employed (e.g., 0 and π radians). Therefore, only two locations in the 8PSK ROM will be accessed for GMSK modulation, namely, 8PSK ROM address (1,1,1), corresponding to a phase of zero radian, and (1,0,0), corresponding to a phase of π radians.

The output of the 8PSK modulator 510 is fed to a phase rotator 513 which rotates the phase of the 8PSK signal by a predetermined amount according to the selected modulation protocol. The phase rotator 513 in this example is implemented as a four-bit accumulator 514 which continually adds a predetermined number, such as the number three 522 (corresponding to a phase rotation of 3π/8) for EDGE modulation or the number four 524 (corresponding to a phase rotation of π/2) for GMSK modulation, to its accumulated value. A multiplexer 526, or suitable equivalent thereof, is preferably connected to the accumulator 514 for selecting between one of at least two different accumulator values, 522, 524 in response to an input control signal 528 (e.g., E~/G) coupled thereto.

It is to be appreciated that a four-bit accumulator employs modulo-16 arithmetic (since $2^4$=16). In order to correlate the modulo-16 arithmetic used by the four-bit accumulator with a desired modulo-2π arithmetic for the phase rotator, 2π is preferably mapped to 16, resulting in a phase rotation mapping of: 0⇒0, 1⇒2π/16, 2⇒4π/16, 3⇒3π/8, 4⇒π, . . . , 15⇒15π/8 radians for the accumulator 514. Therefore, the accumulator 514 is preferably configured to continuously add the number three (corresponding to a phase rotation of 3π/8 radian) for EDGE modulation, or the number four (corresponding to a phase rotation of π/2 radian) for GMSK modulation, as stated above. The output of the phase rotator 513 will be added to the output of the 8PSK modulator 510 after the most significant bits (MSBs) are aligned. Both the adder in the accumulator 513 and an adder 515 in the signal path are preferably allowed to wrap around, as stated above, if an overflow or underflow condition occurs.

A two's-complement 517 of the four-bit rotated symbol phase (e.g., for EDGE modulation, 0=0 radian, 1=2π/16, . . . , 15=2π−2α/16) will form an address for a pair of sine (Sin) and cosine (Cos) ROMs 518 to generate the quadrature signals QR (sin ψ) and IR (cos ψ), respectively. Each Sin/Cos ROM 518 is sixteen words long and nine bits wide (e.g., 16×9 bit). Note that certain trigonometric identities (e.g., sin(−θ)=−sin(θ), cos(−θ)=cos(θ) and cos(θ)=sin (θ+π/2)) can be employed to reduce the size of the Sin/Cos ROMs 518 from 32 words (e.g., 16 words for each Sin/Cos ROM) down to eight (8) words (e.g., four words for each Sin/Cos ROM). However, the corresponding circuitry, such as π/2 (90 degree) adders or negators, that is required for these trigonometric identities may actually consume more physical size than the area saved by reducing the size of the ROMs. Hence, a trade-off evaluation should be performed.

Table 2 below summarizes the contents of the sine and cosine ROMs 518. Note that the sine and cosine values are scaled to 255 (as opposed to 256) to achieve perfect symmetry, which helps eliminate or reduce truncation-induced offset. Any additional truncation-induced offset due to the remaining digital signal processing in the transmit channel can be removed by a rounding operation as well as by analog offset cancellation techniques, as understood by those skilled in the art. It is to be appreciated that regardless of the modulation protocol selected, the signal presented to the sine and cosine ROMs 518 is treated the same, therefore only a single pair of Sin/Cos ROMs is required.

TABLE 2

| ROM Address (4 bit, unsigned) | Sine ROM Content (9 bits, 2's complement) | Cosine ROM Content (9 bits, 2's complement) |
|---|---|---|
| 0 | 0 | 255 |
| 1 | 98 | 236 |
| 2 | 180 | 180 |
| 3 | 236 | 98 |
| 4 | 255 | 0 |
| 5 | 236 | −98 |
| 6 | 180 | −180 |
| 7 | 98 | −236 |
| 8 | 0 | −255 |
| 9 | −98 | −236 |
| 10 | −180 | −180 |
| 11 | −236 | −98 |
| 12 | −255 | 0 |
| 13 | −236 | 98 |
| 14 | −180 | 180 |
| 15 | −98 | 236 |

Figure 5C:
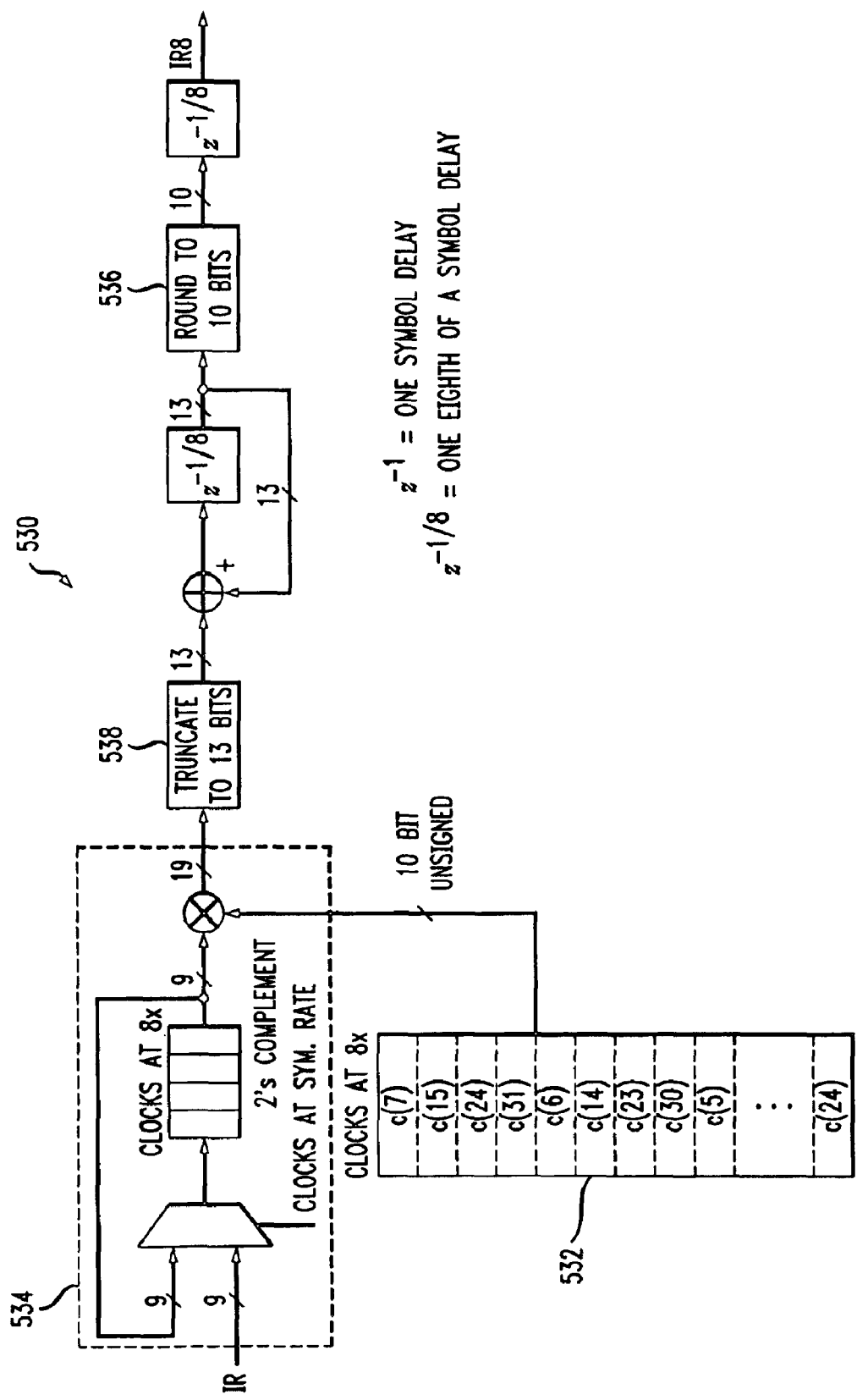
FIG. 5C is a block diagram illustrating an exemplary embodiment of the pulse shaping filter sub-system of the transmit channel depicted in FIG. 5A, formed in accordance with the present invention.

The quadrature signals IR and QR from the output of the cosine and sine ROMs 518, respectively, are oversampled by a factor of eight. This is preferably done through a zero insertion technique which in turn simplifies the design of the pulse shaping filters 530. Referring now to FIG. 5C, each pulse shaping filter 530 is preferably a 32-tap FIR filter 534 whose coefficients are quantized to ten bits (unsigned integer). The filter coefficients are preferably stored in a single 32×10-bit Coefficient ROM 532 which is shared between the I and Q quadrature channels. As described herein above, the coefficients employed will depend upon whether a GMSK or EDGE modulation protocol is selected. By way of example, FIR filter coefficients are summarized in Table 3 below. Again, since the signal at this point is treated the same regardless of the modulation scheme employed, the FIR filter coefficients will be the same.

TABLE 3

| Coefficient Index | Coefficient Value (10-bit unsigned binary 0 to 1024) |
|---|---|
| 0 | 1 |
| 1 | 3 |
| 2 | 7 |
| 3 | 15 |
| 4 | 31 |
| 5 | 57 |
| 6 | 96 |
| 7 | 149 |
| 8 | 216 |
| 9 | 292 |
| 10 | 374 |
| 11 | 453 |
| 12 | 525 |
| 13 | 582 |
| 14 | 621 |
| 15 | 642 |
| 16 | 642 |
| 17 | 621 |
| 18 | 582 |
| 19 | 525 |
| 20 | 453 |
| 21 | 374 |
| 22 | 292 |
| 23 | 216 |
| 24 | 149 |
| 25 | 96 |
| 26 | 57 |
| 27 | 31 |
| 28 | 15 |
| 29 | 7 |
| 30 | 3 |
| 31 | 1 |

With continued reference to FIG. 5C, since one out of eight consecutive inputs to the pulse shaping filter is nonzero, only four multiplications need to be performed for every interpolated output. Assuming an output rate of 13/6 Msps, there are six cycles (of 13 MHz clock) available for performing these four multiplications and the corresponding accumulations. Hence, one multiplier can be used to perform the pulse shape filtering function. Four cycles are preferably devoted to the four multiplications, one cycle to the output rounding to ten bits 536 and one cycle for accumulation reset. Prior to output rounding 536, the 19-bit output from the FIR filter 534 is truncated 538 to 13 bits.

Figure 5D:
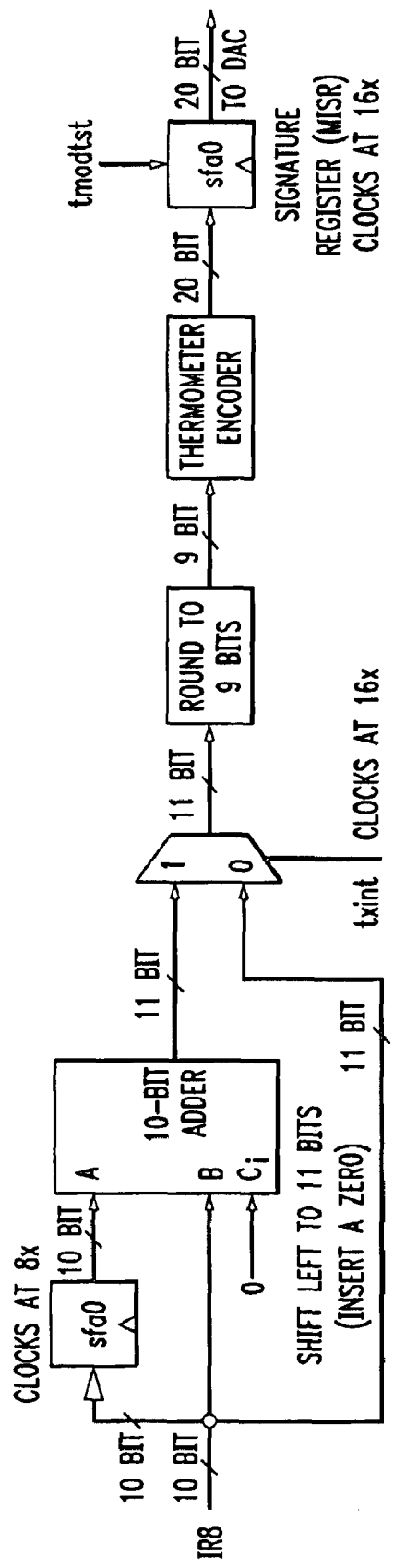
FIG. 5D is a block diagram illustrating an exemplary embodiment of the linear interpolator sub-system of the transmit channel depicted in FIG. 5A, formed in accordance with the present invention.

With reference again to FIG. 5A, the outputs of the pulse shaping filters 530 (IR8 and QR8) are preferably fed through a conventional linear interpolator by two 540 to increase the sampling rate to 13/3 MHz (from 13/6 MHz). An exemplary architecture for implementing this linear interpolator 540 is illustrated in FIG. 5D. The purpose of this interpolator is to relax the smoothing filter 560 specifications by attenuating an image component of the signal at the sampling rate of 13/6 MHz. As known by those skilled in the art, increasing the sampling rate of a signal pushes the image component to a higher frequency, thus permitting a lower order smoothing filter to be subsequently used. The quadrature modulated outputs of the interpolators 540 are then fed through a pair of 9-bit DACs 550 and a pair of smoothing filters 560 before being passed to the RF section for transmission of the modulated signal.

It is to be appreciated that embodiments of the multi-protocol modulator described herein may be implemented in whole or in part by a semiconductor device. Furthermore, as previously stated herein, at least a portion of the modulator may be implemented by, for example, a digital signal processor (DSP).

Figure 6:
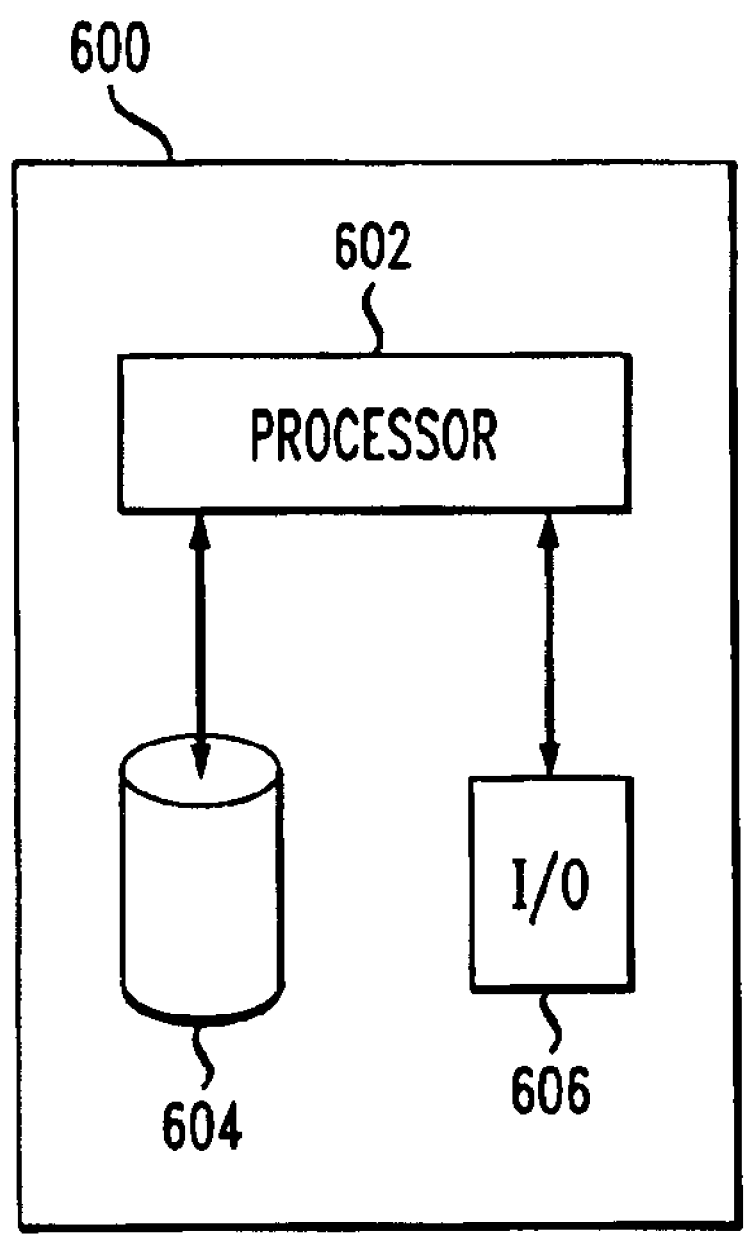
FIG. 6 is a block diagram illustrating a computer system suitable for implementing at least a portion of the methodologies of the present invention.

Referring now to FIG. 6, a block diagram is shown illustrating a generalized hardware architecture of a processor system suitable for implementing, at least in part, various functional components/sub-systems of the multi-protocol modulator as depicted in the figures and described in detail herein. It is to be appreciated that the components of the modulator may be implemented on one or more such processor systems.

As shown, the processor system may be implemented in accordance with a processor 602, memory 604 and I/O device(s) 606. It is to be appreciated that the term "processor" as used herein is intended to include any processing device, such as, for example, one that includes a central processing unit (CPU), digital signal processor (DSP) and/or other processing circuitry. It is also to be understood that the term "processor" may refer to more than one processing device or to one or more elements of a given processing device, and that various elements associated with a processing device may be shared by other processing devices. The term "memory" as used herein is intended to include memory associated with a processor or CPU, such as, for example, random access memory (RAM), read only memory (ROM), flash memory, etc. In addition, the term "input/output device" or "I/O device" as used herein is intended to include, for example, one or more input devices (e.g., keyboard, keypad, point-and-click device, etc.) for entering data to the processing unit, and/or one or more output devices (e.g., display, audio output device, etc.) for presenting results associated with the processing unit. Accordingly, software components including instructions or code for performing the methodologies of the invention, as described herein, may be stored in one or more of the associated memory devices (e.g., ROM, fixed or removable memory, etc.) and, when ready to be utilized, loaded in whole or in part (e.g., into RAM) and executed by a CPU.

Although illustrative embodiments of the present invention have been described herein with reference to the accompanying drawings, the invention similarly contemplates that the techniques set forth herein may be used generally to implement a multi-protocol modulator capable of supporting two or more different modes of operation, each mode of operation corresponding to a different type of modulation. To accomplish this, the 8PSK modulator (depicted in several of the figures) is preferably replaced with an m-level phase shift keying (m-PSK) modulator. Furthermore, it is to be understood that the invention is not limited to the precise embodiments described herein, and that various other changes and modifications may be affected therein by one skilled in the art without departing from the scope or spirit of the invention.

What is claimed is:

1. A modulator capable of supporting two or more different modes of operation, each mode of operation corresponding to a different type of modulation, the modulator comprising:

an m-level phase shift keying (m-PSK) modulator including an input for receiving a serial data stream, and an output, m being an integer;

a phase rotator operatively coupled to the output of the M-PSK modulator for rotating a phase of an output signal generated by the m-PSK modulator by at least one of a first predetermined value corresponding to a first modulation type in a first mode of operation and a second predetermined value corresponding to a second modulation type in a second mode of operation;

a pulse shaping filter operatively coupled to the phase rotator; and a controller operatively coupled to the phase rotator for selectively switching the modulator between the first and second modes of operations;

wherein the phase rotator comprises:

an adder including first and second inputs and an output, the first input of the adder being operatively coupled to the output of the m-PSK modulator; and a ramp generator operatively coupled to the second input of the adder, wherein the ramp generator is responsive to the controller for selectively generating a phase ramp signal having at least one of a first slope in the first mode of operation and a second slope in the second mode of operation.

2. The modulator of claim 1, wherein m is equal to eight.

3. The modulator of claim 1, wherein the first modulation type is GMSK (Gaussian minimum shift keying) and the second modulation type is EDGE (enhanced data rates for GSM evolution).

4. The modulator of claim 1, wherein the pulse shaping filter is configured to provide a linearized Gaussian response.

5. The modulator of claim 1, further comprising a transmit buffer operatively coupled to the input of the m-PSK modulator, the transmit buffer at least temporarily storing a portion of the serial data stream.

6. The modulator of claim 5, wherein the transmit buffer includes a serial-to-parallel converter for operatively transforming the serial data stream into triplets.

7. The modulator of claim 1, wherein the m-PSK modulator includes a read only memory (ROM) for storing a plurality of predetermined phases corresponding to the input data stream.

8. The modulator of claim 1, wherein the ramp generator comprises a counter for generating the phase ramp signal, the counter being programmable in response to the controller for operatively selecting a step size corresponding to at least one of the first slope and the second slope.

9. The modulator of claim 1, wherein the first slope is $\pi/2$ radians per step and the second slope is $3\pi/8$ radians per step.

10. The modulator of claim 1, wherein the pulse shaping filter includes a pulse amplitude modulator (PAM).

11. The modulator of claim 1, wherein the pulse shaping filter includes a finite impulse response (FIR) filter, the FIR filter including a predetermined number of taps wherein the taps are operatively configured to provide a linearized Gaussian response.

12. A semiconductor device for supporting two or more different types of modulation, the semiconductor device comprising:

a first modulator for performing a first type of modulation of an input data stream, the first modulator including one or more sub-circuits;

a second modulator for performing a second type of modulation of the input data stream, the second modulator including at least one sub-circuit that is common to the first modulator, the common sub-circuit operating in at least one of a first mode of operation corresponding to the first type of modulation and a second mode of operation corresponding to the second type of modulation; and a controller operatively coupled to the first and second modulators, the controller being responsive to at least one control signal for selectively switching between one of at least the first and second modes of operation;

wherein the first and second modulators include a common phase rotator, the phase rotator being responsive to the controller and operatively selecting one of at least a first phase rotation value in the first mode of operation and a second phase rotation value in the second mode of operation, the phase rotator comprising:

an adder including first and second inputs and an output, the first input of the adder being operatively coupled to the output of at least one of the first and second modulators; and a ramp generator operatively coupled to the second input of the adder, wherein the ramp generator is responsive to the controller for selectively generating a phase ramp signal having at least one of a first slope in the first mode of operation and a second slope in the second mode of operation.

13. The semiconductor device of claim 12, wherein the first phase rotation value is $\pi/2$ radian and the second phase rotation value is $3\pi/8$ radian.

14. The semiconductor device of claim 12, wherein the first and second modulators include a common m-level phase shift keying (m-PSK) modulator, m being an integer the m-PSK modulator being responsive to the controller and operatively selecting one of at least a first phase mapping in the first mode of operation and a second phase mapping in the second mode of operation.

15. The semiconductor device of claim 14, wherein m is equal to eight.

16. The semiconductor device of claim 12, wherein the first and second modulators include a common pulse shaping filter, the pulse shaping filter being configured to provide a linearized Gaussian response.

17. The semiconductor device of claim 12, wherein the first type of modulation is Gaussian mean shift keying (GMSK) and the second type of modulation is Enhanced Data Rates for GSM Evolution (EDGE).

18. A method for selectively modulating a signal in one of at least a first modulation type and a second modulation type, the method comprising the steps of:

providing an m-level phase shift keying (m-PSK) modulator, m being an integer, the m-PSK modulator operating in at least one of a first mode wherein the m-PSK modulator employs a first phase mapping corresponding to the first modulation type and a second mode wherein the m-PSK modulator employs a second phase mapping corresponding to the second modulation type;

modulating an input serial data stream using the m-PSK modulator in one of the first mode or the second mode of operation and generating an m-PSK-modulated signal;

rotating a phase of the m-PSK-modulated signal by one of a first predetermined phase rotation value in the first mode of operation and a second predetermined phase rotation value in the second mode of operation and generating a phase-rotated signal; and filtering the phase-rotated signal using a pulse shaping filter;

wherein the step of rotating the phase includes the steps of:

generating a phase ramp signal, the phase ramp signal having a first slope corresponding to the first mode of operation and a second slope corresponding to the second mode of operation; and adding the phase ramp signal to the m-PSK-modulated signal.

19. The method of claim 18, wherein the pulse shaping filter is configured to provide a linearized Gaussian response.

20. The method of claim 18, further comprising the step of buffering the input serial data stream.

21. The method of claim 18, wherein the first type of modulation is Gaussian minimum shift keying (GMSK) and the second type of modulation is Enhanced Data Rates for GSM Evolution (EDGE).

* * * * *